United States Patent
Yoo

(10) Patent No.: US 12,087,168 B2
(45) Date of Patent: Sep. 10, 2024

(54) SYSTEM AND METHOD OF MANAGING TRAFFIC INFORMATION ON PLATOONING VEHICLE

(71) Applicants: Hyundai Motor Company, Seoul (KR); Kia Motors Corporation, Seoul (KR)

(72) Inventor: Ha Na Yoo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 422 days.

(21) Appl. No.: 16/513,482

(22) Filed: Jul. 16, 2019

(65) Prior Publication Data
US 2020/0193838 A1 Jun. 18, 2020

(30) Foreign Application Priority Data
Dec. 14, 2018 (KR) .................. 10-2018-0161542

(51) Int. Cl.
| G08G 1/00 | (2006.01) |
| G07C 5/00 | (2006.01) |
| G08G 1/01 | (2006.01) |
| G08G 1/09 | (2006.01) |
| H04W 4/46 | (2018.01) |

(52) U.S. Cl.
CPC .............. *G08G 1/22* (2013.01); *G07C 5/008* (2013.01); *G08G 1/0141* (2013.01); *G08G 1/091* (2013.01); *H04W 4/46* (2018.02)

(58) Field of Classification Search
CPC ........ G08G 1/22; G08G 1/0141; G08G 1/091; G08G 1/00; H04W 4/46; H04W 4/08; G07C 5/008
See application file for complete search history.

(56) References Cited

U.S. PATENT DOCUMENTS

| 2004/0215373 | A1* | 10/2004 | Won ....................... G08G 1/161 |
| | | | 701/1 |
| 2017/0021764 | A1* | 1/2017 | Adams ................. G07C 5/0825 |
| 2017/0270785 | A1* | 9/2017 | Umehara ............. G08G 1/0112 |
| 2017/0293296 | A1* | 10/2017 | Stenneth ................ G06Q 20/10 |
| 2018/0211521 | A1* | 7/2018 | Linder ................. G08G 1/0116 |
| 2019/0130765 | A1* | 5/2019 | Tulpule ................... H04W 4/46 |
| 2020/0184827 | A1* | 6/2020 | Park ..................... G08G 1/0145 |

FOREIGN PATENT DOCUMENTS

KR          20160091117          8/2016

* cited by examiner

*Primary Examiner* — Tyler J Lee
*Assistant Examiner* — Daniel Tyler Reich
(74) *Attorney, Agent, or Firm* — MORGAN, LEWIS & BOCKIUS LLP

(57) ABSTRACT

A system for managing traffic information on a platooning vehicle may include a platooning vehicle group classified into at least one or more small groups according to at least one or more stops and including at least one or more platooning vehicles configured to generate second driving information and to transmit the second driving information to the outside through the wireless communication network in preset time units, and a traffic information management server configured to receive the first or second driving information transmitted from the single driving vehicles or the platooning vehicle group and to manage the second driving information to generate and store traffic information on a platooning vehicle which is classified according to one or more stops, in the form of a database.

5 Claims, 3 Drawing Sheets

SYSTEM AND METHOD OF MANAGING TRAFFIC INFORMATION ON PLATOONING VEHICLE

CROSS-REFERENCE TO RELATED APPLICATION

The present application claims priority to Korean Patent Application No. 10-2018-0161542, filed on Dec. 14, 2018, the entire contents of which is incorporated herein for all purposes by this reference.

BACKGROUND OF THE INVENTION

Field of the Invention

The present invention relates to a system and method of managing traffic information on a platooning vehicle.

Description of Related Art

In general, an autonomous vehicle is a vehicle that recognizes a road situation to automatically drive even if a driver does not control a brake, a handle, an vehicle acceleration pedal, and the like. Accurately, the autonomous vehicle is a different concept from a driverless vehicle (which is a vehicle driven without a driver) but is interchangeably used.

For an autonomous vehicle as core technologies for embodying a smart car, a highway driving assist (HDA) system (which is technology for automatically maintaining a distance between vehicles), a blind spot detection (BSD) system (which is technology for detecting surrounding vehicles and raising the alarm during backward movement), an autonomous emergency braking (AEB) system (which is technology for driving a braking device when a leading vehicle is not recognized), a lane departure warning system (LDWS), a lane keep assist system (LKAS) (which is technology for compensating lane departure without a turn signal), advanced smart cruise control (ASCC) (which is technology for driving at constant speed while maintaining a distance between vehicles at a configured speed), a traffic jam assistant (TJA) system, and the like need to be embodied.

Such an autonomous vehicle may be classified into a single driving vehicle and a platooning vehicle in terms of management of traffic information, and speeds, weights, and previous reactivity of traffic information on the single driving vehicle and the platooning vehicle are different from each other and, thus, collection and management of traffic information need to be applied in different ways but, there has been no detailed proposal therefor thus far.

For example, a speed of the single driving vehicle is frequently changed depending on a traffic condition but, a speed of the platooning vehicle is a constant speed or a low speed.

A traffic volume of the single driving vehicle has a small weight but, instead, has a high freedom degree and high reactivity with respect to change in a traffic light since only one vehicle is moved and, on the other hand, the platooning vehicle has a high traffic volume weight, a large total vehicle length due to platooning, and low reactivity with respect to change in a traffic light.

The single driving vehicle has low previous reactivity and slowly makes a lane change for road departure (lane change, IC departure, or the like) compared with platooning and, on the other hand, the platooning vehicle has high previous reactivity and previously makes a lane change for road departure (lane change, IC departure, or the like) compared with the single driving vehicle.

Due to such characteristics between the single driving vehicle and the platooning vehicle, various patent technologies for platooning vehicles have been recently provided.

For example, Korean Patent Publication No. 10-0957137 (May 3, 2010) may include a platooning control system and method for effectively controlling platooning in a road environment for facilitating communication with a road infrastructure by recognizing and collecting information on a road situation and performing a series of processes including generation and release of platooning information while transmitting and receiving information related to surrounding platooning to and from a vehicle communication unit of a driving vehicle, by a road surrounding communication unit.

Korean Patent Publication No. 10-2015-0106260 (Sep. 21, 2015) discloses a cooperative driving apparatus and method between platooning vehicles for proposing a message and a communication protocol in a driver, a service terminal, and a vehicle control device, which is required for a cooperative driving service in a form of platooning of a plurality of vehicles.

However, the aforementioned platooning vehicles receive traffic information and use the information as driving control information and are concentrated on technology for how to use an autonomous vehicle but, when a platooning vehicle is generalized, detailed proposals for how to collect and process traffic information on an autonomous vehicle have not been made.

The information disclosed in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a system and method of managing traffic information on a platooning vehicle that substantially obviates one or more problems due to limitations and disadvantages of the related art.

Various aspects of the present invention are directed to providing a system and method of managing traffic information on a platooning vehicle, for collecting driving information including small group information having distribution information while driving of a platooning vehicle if at least one or more stops and/or final destinations are different from each other when the driving information is collected at a preset period during movement of platooning vehicles including at least two or more autonomous vehicles.

Various aspects of the present invention are directed to providing a system and method of managing traffic information on a platooning vehicle, for applying small group information including distribution information while driving of the platooning vehicle to generate traffic information when driving information transmitted from the platooning vehicle is received and at least one or more stops and/or final destinations are different from each other.

Additional advantages, objects, and features of the present invention will be set forth in part in the description which follows and in part will become apparent to those having ordinary skill in the art upon examination of the following or may be learned from practice of the present invention.

The objectives and other advantages of the present invention may be realized and attained by the structure particularly pointed out in the written description and claims hereof as well as the appended drawings.

To achieve these objects and other advantages and in accordance with the purpose of the present invention, as embodied and broadly described herein, a system for managing traffic information on a platooning vehicle may include at least one or more single driving vehicles configured to generate first driving information and to transmit the first driving information to the outside through a wireless communication network in preset time units, a platooning vehicle group classified into at least one or more small groups according to at least one or more stops and including at least one or more platooning vehicles configured to generate second driving information and to transmit the second driving information to the outside through the wireless communication network in preset time units, and a traffic information management server configured to receive the first or second driving information transmitted from the single driving vehicles or the platooning vehicle group and to manage the second driving information to generate and store traffic information on a platooning vehicle which is classified according to one or more stops, in a form of a database.

In another aspect of the present invention, a method of managing traffic information on a platooning vehicle may include determining whether a subject vehicle is one of one or more platooning vehicles belonging to a platooning vehicle group using driving information related to an arbitrary platooning vehicle, which is generated in preset period units, upon determining that the subject vehicle is one of the platooning vehicles belonging to the platooning vehicle group, determining whether the subject vehicle is a lead platooning vehicle, upon determining that the subject vehicle is not the lead platooning vehicle, determining whether the subject vehicle is a candidate lead platooning vehicle supposed to function as the lead platooning vehicle on a separated path after a predetermined stop, upon determining that the subject vehicle is the candidate lead platooning vehicle, inserting preset platooning small group information into second driving information to be generated by the subject vehicle, by the corresponding platooning vehicle, and upon determining that the subject vehicle is the lead platooning vehicle, inserting preset platooning group information into the second driving information.

Here, the method may further include receiving the second driving information, determining whether the received second driving information is platooning information, upon determining that the second driving information is the platooning information, separating and processing platooning group information, platooning small group information, and driving information for each platooning vehicle, which are inserted into the second driving information, and applying a weight to traffic information obtained by processing and analyzing the second driving information.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
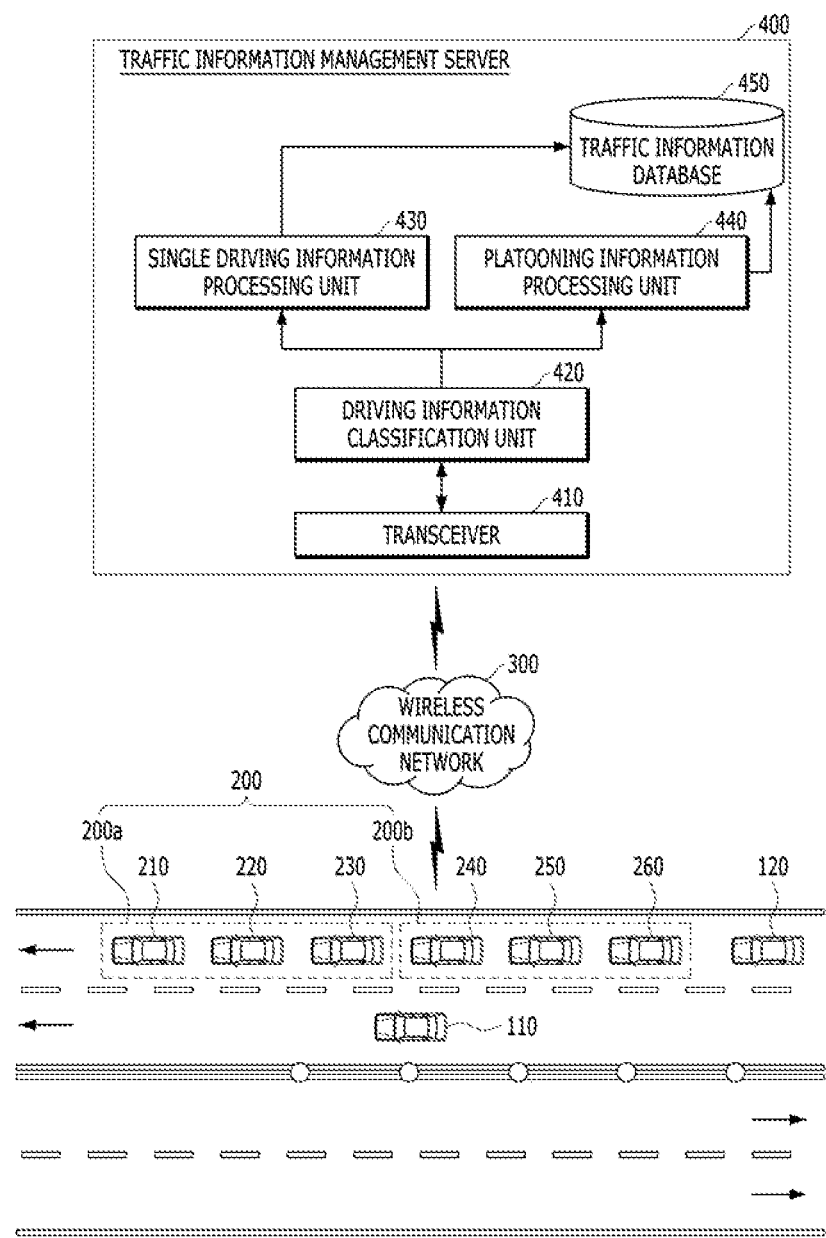
FIG. 1 is a block diagram showing the configuration of a system for managing traffic information on a platooning vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present invention are described in detail for those of ordinary skill in the art to easily implement with reference to the accompanying drawings. However, the present invention may be implemented in various different forms and is not limited to these embodiments. To clearly describe the present invention, a part without concerning to the description is omitted in the drawings, and like reference numerals in the specification denote like elements.

Throughout the specification, one of ordinary skill would understand terms 'include', 'comprise', and 'have' to be interpreted in default as inclusive or open rather than exclusive or closed unless expressly defined to the contrary. Furthermore, the terms such as "unit", "module", etc. disclosed in the specification mean units for processing at least one function or operation, which may be implemented by hardware, software, or a combination thereof.

Throughout the specification, when a certain part "includes" a certain component, this indicates that the part may further include another component instead of excluding another component unless there is no different disclosure. The same reference numbers will be used throughout the drawings and the specification to refer to the same parts.

Hereinafter, a configuration and operation of a system for managing traffic information on a platooning vehicle, applicable to embodiments of the present invention, will be described in detail with reference to FIG. 1, FIG. 2, and FIG. 3.

FIG. 1 is a block diagram showing the configuration of a system for managing traffic information on a platooning vehicle according to an exemplary embodiment of the present invention.

Referring to FIG. 1, the system for managing traffic information on a platooning vehicle according to an exemplary embodiment of the present invention may include at least one or more single driving vehicles 110 and 120 that generate first driving information and transmits the first driving information to the outside through a wireless communication network 300 in preset time units, a platooning vehicle group 200 which is classified into at least one or more small groups 200a and 200b according to at least one or more stops and includes at least one or more platooning vehicles 210 to 260 for generating second driving information and transmitting the second driving information to the outside through the wireless communication network 30 in preset time units, and a traffic information management server 400 that receives the first or second driving information transmitted from the single driving vehicles 110 and 120 or the platooning vehicle group 200 and manages the second driving information to generate and store traffic information on a platooning vehicle which is classified according to one or more stops, in a form of a database.

Here, the first and second driving information may be data including at least one or more of a vehicle type, a vehicle speed, a global positioning system (GPS), vehicle acceleration, vehicle deceleration, or a driving road type, which is detected by various sensors including a camera.

The one or more platooning vehicles 210 to 260 belonging to the platooning vehicle group 200 is configured to generate the second driving information in the preset time units and may separately transmit the second driving information to a lead platooning vehicle 210 which is preset on a same driving path or is set depending on a driving position thereof, and the lead platooning vehicle 210 may collect the second driving information which is received from each of the platooning vehicles 220 to 260 except for the lead platooning vehicle 210 itself in predetermined time units, is configured to generate the first group driving information obtained by adding driving information and group information related to the lead platooning vehicle 210 itself to the collected second driving information, and may transmit the first group driving information to the traffic information management server 400.

The first group driving information may have a data format including a header configured with group information and small group information, a body configured with the second driving information, and a footer.

As shown in FIG. 1, the traffic information management server 400 may include a transceiver 410 for receiving the first or second driving information transmitted from the single driving vehicles 110 and 120 or the platooning vehicle group 200, a driving information classification unit 420 for determining whether the first or second driving information received by the transceiver 410 is single driving information or platooning information and extracting and outputting the group information and/or small group information when the first or second driving information is the platooning information, a single driving information processing unit 430 for generating first traffic information obtained by applying a traffic condition of a corresponding driving road to the single driving information output from the driving information classification unit 420, a platooning information processing unit 440 for generating second traffic information obtained by applying the traffic condition of the corresponding driving road to the platooning information, and a traffic information database 450 for managing the first and second traffic information generated from the single driving information processing unit 430 and the platooning information processing unit 440, in a form of a database.

Here, when generating the second traffic information obtained by applying the traffic condition of the corresponding driving road to the platooning information, the platooning information processing unit 440 may further apply a weight which is proportional to a total number of platooning vehicles belonging to the platooning group.

Hereinafter, an operation of managing traffic information on a platooning vehicle according to an exemplary embodiment of the present invention will be described with reference to FIG. 2 and FIG. 3.

Figure 2:
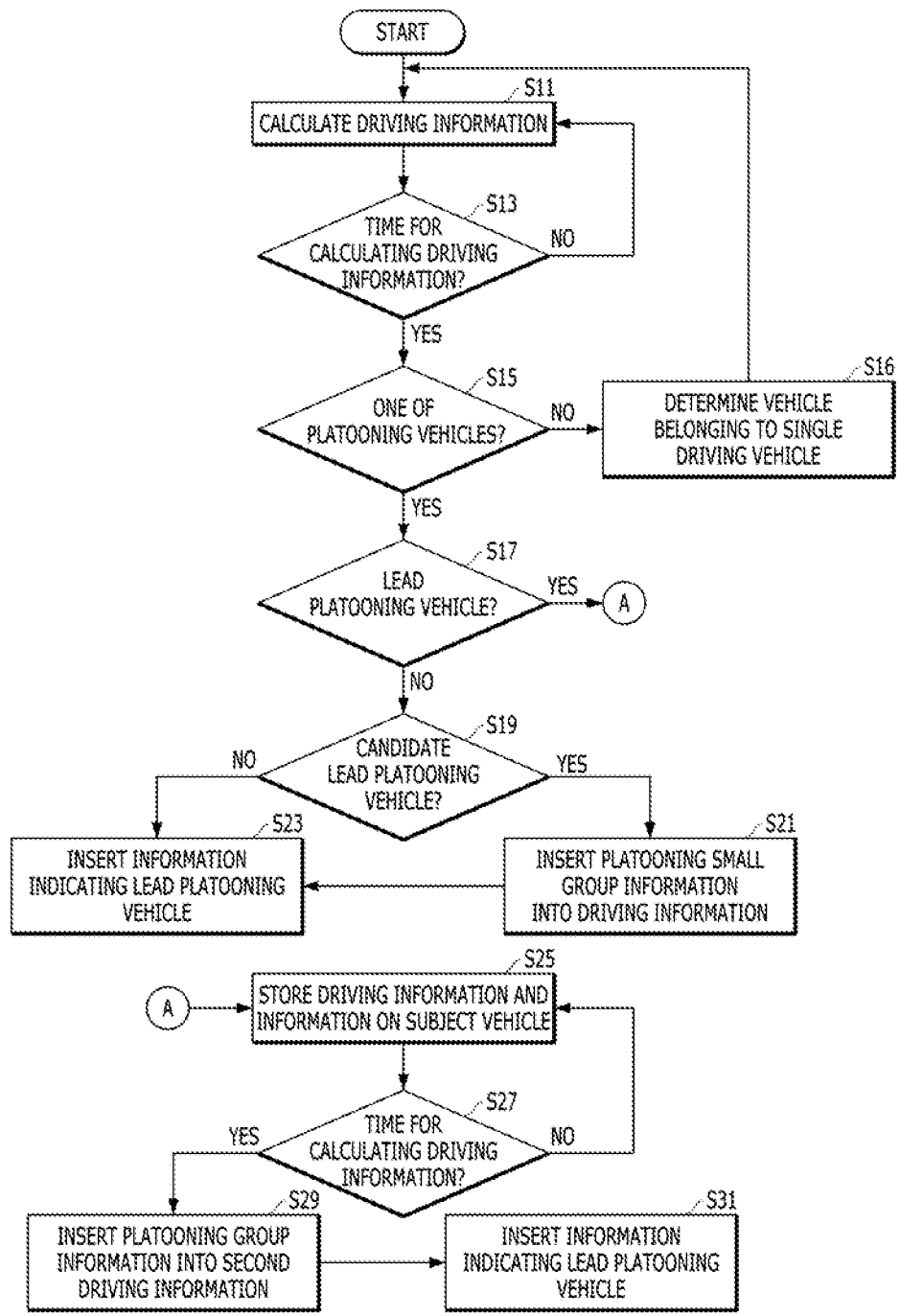
FIG. 2 is a flowchart for explanation of an operation of managing traffic information, performed by a platooning vehicle, in a procedure of managing the traffic information on the platooning vehicle according to an exemplary embodiment of the present invention.

FIG. 2 is a flowchart for explanation of an operation of managing traffic information, performed by a platooning vehicle, in a procedure of managing the traffic information on the platooning vehicle according to an exemplary embodiment of the present invention.

As shown in FIG. 2, arbitrary single driving vehicles 110 and 120 and each of the platooning vehicles 210 to 260 may determine the first and second driving information thereof in preset period units and may store the determined driving information in an internal memory (S11). The first and second driving information may be data including at least one or more of a vehicle type, a vehicle speed, a global positioning system (GPS), vehicle acceleration, vehicle deceleration, or a driving road type, which is detected by various sensors including a camera.

Each of the platooning vehicles 210 to 260 may determine whether a current time is a time for determining the second driving information (S13) and, as the determination result, upon determining that the current time is the time for determining the second driving information, each of the platooning vehicles 210 to 260 may determine whether the subject vehicle is one of the platooning vehicles 210 to 260 belonging to the platooning vehicle group 200 (S15).

In an exemplary embodiment of the present invention, each of the platooning vehicles 210 to 260 and arbitrary single driving vehicles 110 and 120 may include controllers, which may be at least one microprocessor operated by a predetermined program which may include a series of commands for carrying out a method in accordance with various exemplary embodiments of the present invention.

In the instant case, as the determination result of operation S15, when the subject vehicle is not determined to be one of the platooning vehicles 210 to 260 belonging to the platooning vehicle group 200, the subject vehicle may be determined to be a vehicle belonging to the single driving vehicle (S16), the collected first driving information may be transmitted to the traffic information management server 400 and, simultaneously, a period for determining driving information may be initialized.

However, as the determination result of operation S15, when the subject vehicle is determined to be one of the platooning vehicles 210 to 260 belonging to the platooning vehicle group 200, whether the subject vehicle is a lead platooning vehicle may be determined (S17).

In the instant case, as the determination result of operation S17, when the subject vehicle is not determined to be the lead platooning vehicle, whether the subject vehicle is a candidate lead platooning vehicle supposed to function as the lead platooning vehicle on a separated path after a specific stop may be determined (S19).

In the instant case, as the determination result of operation S19, when the subject vehicle is determined to be the candidate lead platooning vehicle supposed to function as the lead platooning vehicle, the corresponding platooning vehicle may insert platooning small group information that selectively includes a small group ID, a vehicle ID in a small group, a point of departure, a stop, a destination, a driving path, a predicted stop separated from the first platooning group, and a predicted time of separation into the second driving information to be generated by the corresponding platooning vehicle (S21) and, as the determination result of operation S19, when the subject vehicle is not determined to be the candidate lead platooning vehicle supposed to function as the lead platooning vehicle, after operation S21, the corresponding platooning vehicle may insert information indicating that the subject vehicle is the lead platooning vehicle into the data format of the second driving information and may initialize a period for determining the second driving information while transmitting the corresponding second driving information to the traffic information management server 400 (S23).

As the determination result of operation S17, when the subject vehicle is determined to be the lead platooning vehicle, each of the received second driving information and information on the subject vehicle may be stored in an internal memory (S25).

As such, each of the platooning vehicles 210 to 260 may determine whether a current time is a time for determining the second driving information (S27) and, as the determination result, upon determining that the current time is the time for determining the second driving information, each of the platooning vehicles 210 to 260 may insert platooning group information that includes large group ID, a point of departure, a destination, and a driving path, into the second driving information (S29), may insert information indicating that the subject vehicle is the lead platooning vehicle into the data format of the second driving information, and may re-initialize a period for determining the second driving information while transmitting the corresponding second driving information to the traffic information management server 400 (S31).

Figure 3:
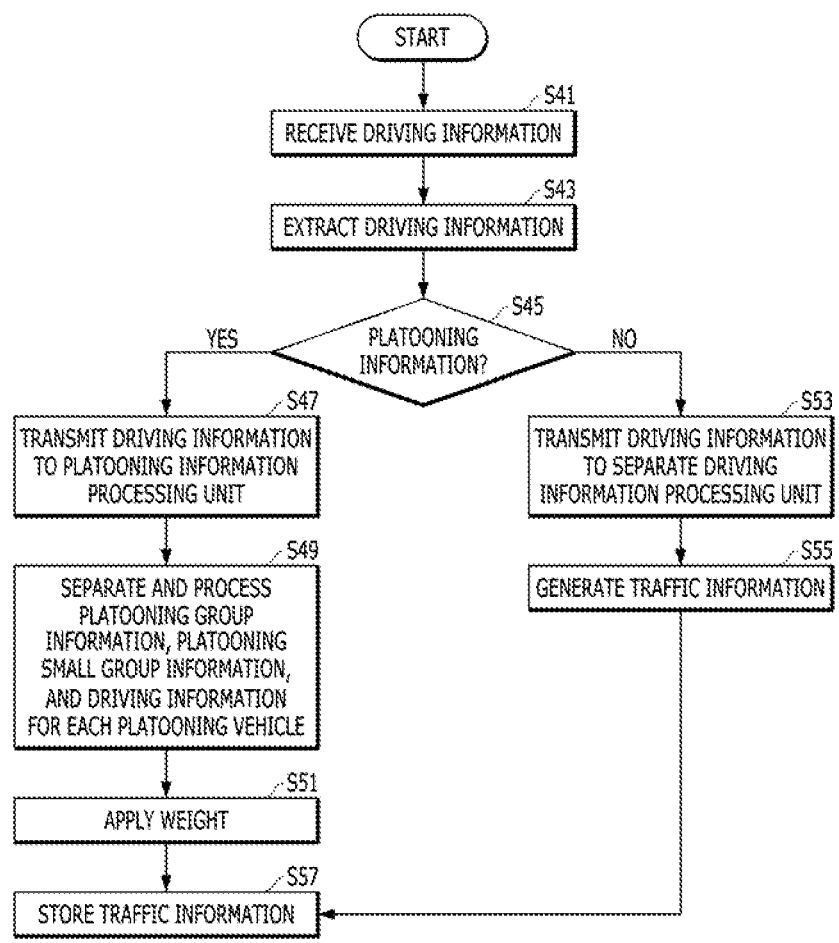
FIG. 3 is a flowchart for explanation of an operation of managing traffic information, performed by a traffic information management server, in a procedure of managing traffic information on a platooning vehicle according to an exemplary embodiment of the present invention.

FIG. 3 is a flowchart for explanation of an operation of managing traffic information, performed by a traffic information management server, in a procedure of managing traffic information on a platooning vehicle according to an exemplary embodiment of the present invention.

Referring to FIG. 3, the transceiver 410 of the traffic information management server 400 may receive the first or second driving information transmitted from the single driving vehicles 110 and 120 or the platooning vehicle group 200, as shown in FIG. 1 (S41).

As such, the driving information classification unit 420 may extract the first or second driving information received by the transceiver 410 (S43) and may determine whether the extracted first or second driving information is single driving information or platooning information (S45).

In the instant case, as the determination result of operation S45, upon determining that the extracted second driving information is the platooning information, the driving information classification unit 420 may transmit the received second driving information to the platooning information processing unit 440 (S47).

As such, the platooning information processing unit 440 may separate and process the platooning group information, the platooning small group information, and driving information for each platooning vehicle, which are inserted into the data format of the received second driving information (S49).

In the instant case, the platooning information processing unit 440 may apply a weight to traffic information obtained by processing and analyzing the second driving information (S51) and may store the generated second traffic information in the traffic information database 450 (S57).

According to an exemplary embodiment of the present invention, a weight may be applied using one of the following three methods.

First, a weight may be applied to traffic information related to a position in which a platooning vehicle currently drives and, in this regard, a total number of vehicles belonging to a platooning group may be checked and a traffic information weight (Y) at a corresponding position based on Global Positioning System (GPS) may be assigned.

Second, a weight may be applied to traffic information related to a driving path of a platooning group and, in this regard, the weight (Y) may be applied to the driving path in the platooning group information or a separate weight (Y) may also be applied to an IC that the platooning group enters and a driving lane thereof.

Third, the weight (Y) may be applied to a driving path of a platooning small group and, in this regard, the weight (Y) may be applied in proportion to a total number of vehicles belonging to the platooning small group, the weight (Y) and a vehicle number (Yn) may be applied to a driving path in each piece of the platooning small group information, or a separate weight (Y) may be applied to an IC that each platooning small group enters and a driving lane thereof.

However, as the determination result of operation S45, upon determining that the extracted driving information is single driving information, the driving information classification unit 420 may transmit the separated first driving information to the platooning information processing unit 440 (S53).

Accordingly, the single driving information processing unit 430 is configured to generate the first traffic information obtained by applying the traffic condition of the corresponding driving road to first single driving information transmitted from the driving information classification unit 420 (S55) and may store the generated first traffic information in the traffic information database 450 (S57).

Such weights are applied because a platooning vehicle largely affects traffic congestion and influence of the platooning vehicle is further increased as the number of vehicles is increased compared with the single driving vehicle even if a plurality of vehicles of the same type since vehicles in the platooning vehicle have a narrow clearance between vehicles, a plurality of vehicles simultaneously drive, and the vehicles in the platooning vehicle have a low freedom degree between vehicles. For the present reason, the total number of vehicles in the large group of the platooning vehicle may be checked and the weight (Y) may be assigned to traffic information for each vehicle.

The driving path of the platooning group is not likely to be changed in the future and all platooning vehicle in the platooning group are changed when a path is changed and, thus, may largely cause traffic congestion in the future compared with the driving path of the single driving vehicle. As a total number of vehicles are increased, influence thereof may be further increased. For the present reason, the total number of platooning vehicles belonging to the platooning group may be checked and the traffic information weight (Y) of the platooning group may be assigned.

According to an exemplary embodiment of the present invention, a total number of vehicles for each small group may be re-checked from a section after a stop at which a small group is separated from the platooning group and a prediction weight of traffic congestion with respect to a driving path in the future may be re-calculated, in consideration of the driving path of the platooning small group.

Such weights may be applied to acquire the time required for traffic passage according to Equation 1 below.

$$LT=[L/(F*V+P)]*3.6 \quad \text{[Equation 1]}$$

Here, LT is the time required for traffic passage of a driving road and has a unit of second (s). L is an actual length of the driving road and has a unit of meter (m). V is a predicted speed value (Km/h) of the driving road. P is the preference of drivers based on attributes of the driving path and has a unit of speed (Km/h). F is a weight value of specific facilities that are position around a target driving road on which a passing speed is to be predicted and affect the passing speed of the driving road and has a unit of speed (Km/h). Constant 3.6 may be a constant value for unit conversion (Km/h–>m/s).

Such equation may be changed as necessary but, is used to gain sufficient understanding of an exemplary embodiment of the present invention.

The above configured system and method of managing traffic information on a platooning vehicle according to at least an exemplary embodiment of the present invention may collect driving information including small group information having distribution information while driving of an autonomous vehicle if at least one or more stops and/or final destinations are different from each other when the driving information is collected at a preset period during movement of platooning vehicles including at least two or more autonomous vehicles and, accordingly, a leading autonomous vehicle may transmit all pieces of driving information related to following autonomous vehicles, accurately predicting and measuring a traffic volume.

When driving information transmitted from the platooning vehicle is received and at least one or more stops and/or final destinations are different from each other, small group information including distribution information while driving of an autonomous vehicle may be applied to generate traffic information and, accordingly, traffic information which is the closest to road reality may be collected from an autonomous traffic environment.

During data communication between the platooning vehicle and the traffic information management server, only the leading autonomous vehicle and the traffic information management server may perform data communication on traffic information and, thus, a load of communication traffic may be reduced, providing a financial effect in terms of costs.

It will be appreciated by persons skilled in the art that that the effects that could be achieved with the present invention are not limited to what has been particularly described hereinabove and other advantages of the present invention will be more clearly understood from the detailed description.

The aforementioned present invention can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for managing traffic information on a platooning vehicle, the system comprising:
   at least one or more single driving vehicles configured to generate first driving information and to transmit the first driving information to an outside vehicle through a wireless communication network in preset time units;
   a platooning vehicle group classified into at least one or more sub groups with same origin and destination including at least one or more platooning vehicles configured to generate second driving information and to transmit the second driving information to the outside vehicle through the wireless communication network in preset time units; and
   a traffic information management server configured to receive the first driving information or the second driving information transmitted from the at least one or more single driving vehicles or the platooning vehicle group and to manage the second driving information to generate and store traffic information on a platooning vehicle which is classified according to one or more stops, in a form of a database;
   wherein the traffic information management server includes:
   a transceiver configured to receive the first driving information or the second driving information transmitted from the at least one or more single driving vehicles or the platooning vehicle group;
   a driving information classification unit configured to determine whether the first driving information or the second driving information received by the transceiver is single driving information or platooning information and to extract and output the group information and/or platooning small group information when the first driving information or the second driving information transmitted are the platooning information;
   a single driving information processing unit configured to generate first traffic information obtained by applying a traffic condition of a corresponding driving road to the single driving information output from the driving information classification unit;
   a platooning information processing unit configured to generate second traffic information obtained by applying the traffic condition of the corresponding driving road to the platooning information; and
   a traffic information database configured to manage the first traffic information and the second traffic information generated from the single driving information processing unit and the platooning information processing unit, in a form of a database, wherein the platooning information processing unit is configured to apply a weight to traffic information related to a driving path of a platooning group, wherein the weight is applied to a driving path of a platooning small group and the weight is applied in proportion to a total number of vehicles belonging to the platooning small group, wherein the weight and a vehicle number are applied to a driving path in each piece of that each platooning small group enters and a driving lane thereof, and wherein the total number of vehicles for each platooning small group is re-checked from a section after a stop at which a platooning small group is separated from the platooning group and a prediction weight of traffic congestion with respect to a driving path in the future is re-calculated, in consideration of the driving path of the platooning small group, and wherein the weight is applied to acquire a time required for a traffic passage according to the following equation:

$$LT=[L/(F*V+P)]*3.6;$$

wherein LT is the time required for traffic passage of a driving road and has a unit of second (s), L is an actual length of the driving road and has a unit of meter (m), V is a predicted speed value (Km/h) [kilometers per hour] of the driving road, P is preference of drivers based on attributes of the driving path and has a unit of speed (Km/h), F is a weight of facilities that are position around a target driving road on which a passing speed is to be predicted and affect the passing speed of the driving road and has a unit of speed (Km/h), and Constant 3.6 is the constant value for unit conversion from Km/h to m/s.

2. The system of claim 1,
wherein the first driving information and the second driving information are data including at least one or more of a vehicle type, a vehicle speed, a global positioning system (GPS), vehicle acceleration, vehicle deceleration, or a driving road type.

3. The system of claim 1,
wherein the at least one or more platooning vehicles belonging to the platooning vehicle group is configured to generate the second driving information in the preset time units and to separately transmit the second driving information to a lead platooning vehicle which is preset on a same driving path or is set depending on a driving position thereof; and wherein the lead platooning vehicle is configured to collect the second driving information which is received from each of the at least one or more platooning vehicles except for the lead platooning vehicle itself in predetermined time units, to generate group driving information obtained by adding driving information and group information related to the lead platooning vehicle itself to the second driving information collected, and to transmit the group driving information to the traffic information management server.

4. The system of claim 1,
wherein the first driving information has a data format including a header configured with group information and sub group information, and a body configured with the second driving information.

5. The system of claim 1,
wherein, in generating the second traffic information obtained by applying the traffic condition of the corresponding driving road to the platooning information, the platooning information processing unit further applies the weight which is proportional to a total number of platooning vehicles belonging to the platooning vehicle group.

* * * * *